(12) United States Patent
Schut

(10) Patent No.: US 6,221,139 B1
(45) Date of Patent: Apr. 24, 2001

(54) WATERFAST DYES

(75) Inventor: David M. Schut, Philomath, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/302,551

(22) Filed: Apr. 30, 1999

(51) Int. Cl.⁷ .......................... C09D 11/02; C09D 11/14; C09B 67/00
(52) U.S. Cl. ..................... 106/31.43; 106/31.36; 8/543; 8/561
(58) Field of Search .............. 106/31.36, 31.43, 106/31.48, 31.5, 31.51, 31.52; 8/543, 561

(56) References Cited

U.S. PATENT DOCUMENTS

| 5,102,459 | * | 4/1992 | Ritter et al. | 106/31.27 |
| 5,766,267 | * | 6/1998 | Schumacher et al. | 8/543 |
| 5,772,745 |   | 6/1998 | Gregory et al. | 106/31.48 |
| 6,056,811 | * | 5/2000 | Shimomura et al. | 106/31.36 |

* cited by examiner

*Primary Examiner*—Helene Klemanski

(57) ABSTRACT

The present invention is directed to dyes and coloring liquids, in particular ink-jet inks, formulated using the same, exhibiting either or both improved waterfastness and smearfastness across a range of media for use in many applications such as ink-jet printing.

12 Claims, No Drawings

WATERFAST DYES

FIELD OF INVENTION

The present invention generally relates to waterfast dyes, and more particularly, waterfast ink-jet ink compositions containing the same.

BACKGROUND OF THE INVENTION

The use of ink-jet printing systems has grown dramatically in recent years. This growth may be attributed to substantial improvements in print resolution and overall print quality, coupled with appreciable reduction in cost. Today's ink-jet printers offer acceptable print quality for many industrial, commercial, business, and residential applications at costs fully an order of magnitude lower than comparable products available just a few years ago. Notwithstanding their recent success, intensive research and development efforts continue toward improving water fastness of ink-jet images. Thus, challenge remains to further improve the water fastness of the ink-jet prints.

DETAILED DESCRIPTION OF THE INVENTION

The present invention is directed to dyes, and coloring liquids formulated with the same, having improved water fastness. The dyes and coloring liquids of the present invention exhibit improved water fastness across a range of media and may be used in many applications such as watercolor dyes, and in aqueous-based printing inks, in particular ink-jet inks for use in commercially available ink-jet printers such as DESKJET® printers, manufactured by Hewlett-Packard Company, of Delaware; and other commercially available home or office ink-jet printers.

Aqueous inks of this invention comprise, by weight, from about 0.5 to about 20 wt % colorant (the colorant comprising at least one dye according to the present invention); from about 1 to about 40 wt % of one or more organic solvents; and optionally up to about 20 wt % of an additive independently selected from the group consisting of immobilizing agents, surfactants, buffers, biocides, and mixtures thereof.

The at least one dye of the present invention is represented by formula I, II, or III:

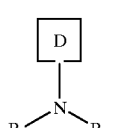

Formula I

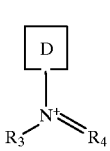

Formula II

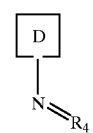

Formula III wherein
  D is chromophore;
  $R_1$ is H or $C_1$–$C_5$, preferably H or $CH_3$, and more preferably H;
  $R_2$ is a carbohydrate as defined by formula IV;
  $R_3$ is $C_1$–$C_5$, preferably $CH_3$;
  $R_4$ is a carbohydrate as defined by formula V.

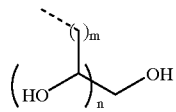

Formula IV

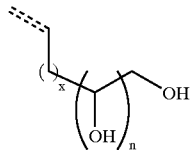

Formula V wherein
  m is 1–5, preferably 1–2, and more preferably 1;
  n is 2–7, preferably 3–5, and more preferably 4;
  x is 0–4, preferably 0–1, and more preferably 0.

The suitable starting (parent) dye contains a chromophore and has a primary or secondary amine functionality (e.g., —$NHR_1$). Examples of suitable starting dyes include: Projet Black 1 (available from Zeneca), Projet Black 2 (available from Zeneca), acid alizarin brown RP, acid blue 29, acid blue 40, acid blue 25, acid blue 129, acid blue 41, acid brown 265, acid yellow 66, acid yellow 69, acid yellow 9, basic blue 7, basic orange 1, basic orange 2, basic red 1, basic red 2, basic red 5, basic red 9, basic violet 14, basic violet 2, cotton orange G, cresyl violet acetate, direct blue 1, direct blue 71, direct brown 191, direct brown 53, disperse black 1, disperse black 2, disperse black 3, disperse black 4, disperse black 7, disperse blue 11, disperse blue 3, disperse orange 3, disperse orange 7, disperse red 31, disperse yellow 9, food black 2, food yellow 2, mordant brown 12, mordant brown 13, mordant brown 14, mordant brown 25, mordant brown 30, mordant brown 33, mordant brown 4, mordant brown 48, mordant green 24, mordant red 28, new fast yellow R, new yellow GMF, new yellow RMF, para chrysoin RRK, parazol brown RK, pigment red 177, pyramine yellow RX, reactive black 1, reactive black 5, reactive blue 15, reactive blue 19, reactive blue 2, reactive blue 4.

The inks of the present invention comprise from about 0.5 to about 20 wt % colorant (the colorant comprising at least one dye according to the present invention), and depending upon the printing application (e.g. producing images on special media or producing text on "plain paper") preferably, from about 1 to about 10 wt % colorant, and more preferably, from about 1 to about 6 wt % colorant.

Organic Solvent

The inks of the present invention comprise from about 1 to about 40 wt % of at least one organic solvent. More preferably, the inks comprise from about 1 to about 25 wt % of at least one organic solvent; and most preferably, from about 5 to about 15 wt %.

The water soluble organic solvents suitably employed in the present ink-jet ink compositions include any of, or a mixture of two or more, of such compounds as nitrogen-containing heterocyclic ketones, such as 2-pyrrolidinone, N-methyl-2-pyrrolidinone (NMP), 1,3-dimethylimidazolid-2-one, and octyl-pyrrolidinone; diols such as ethanediols, (e.g. 1,2-ethanediol), propanediols (e.g. 1,2-propanediol, 1,3-propanediol, 2-ethyl-2-hydroxy-1,3-propanediol, ethylhydroxyl-propanediol (EHPD)), butanediols (e.g., 1,2-butanediol, 1,3-butanediol, 1,4-butanediol), pentanediols (e.g., 1,5-pentanediol), hexanediols (e.g., 1,6-hexanediol, 2,5-hexanediol), heptanediols (e.g., 1,2-heptanediol, 1,7-heptanediol), octanediols (e.g., 1,2-octanediol, 1,8-octanediol); and glycol ethers and thioglycol ethers, commonly employed in ink-jet inks, such as polyalkylene glycols such as polyethylene glycols (e.g., diethylene glycol (DEG), triethylene glycol, tetraethylene glycol, polypropylene glycols (e.g., dipropylene glycol, tripropylene glycol, tetrapropylene glycol), polymeric glycols (e.g., PEG 200, PEG 300, PEG 400, PPG 400), and thiodiglycol. Preferably 1,5-pentanediol, 2-pyrrolidinone, NMP, DEG, and EHPD are employed in the practice of the invention with 1,5-pentanediol, and 2-pyrrolidinone being the most preferred solvents.

Other Ingredients

In the practice of the invention, other ingredients such as surfactants; immobilizing agents; buffers; and biocides; may optionally be employed.

Suitable surfactants may be non-ionic or anionic. Examples of suitable non-ionic surfactants include, secondary alcohol ethoxylates (e.g., Tergitol series available from Union Carbide Co.), non-ionic fluoro surfactants (such as FC-170C available from 3M), non-ionic fatty acid ethoxylate surfactants (e.g., Alkamul PSMO-20 available from Rhone-Poulenc), and fatty amide ethoxylate surfactants (e.g., Aldamide L-203 available from Rhone-Poulenc), acetylenic polyethylene oxide surfactants (e.g. Surfynol 465, available from Air Products & Chemicals, Inc.). Examples of anionic surfactants include alkyldiphenyloxide surfactant (such as Calfax (available from Pilot), and Dowfax (e.g. Dowfax 8390 available from Dow), and anionic fluorinated surfactants (such as Fluorads available from 3M).

Examples of immobilizing agents include: precipitating agents such as inorganic salts (preferably divalent or trivalent salts of chloride and/or nitrate such as $Mg(NO_3)_2$, $Ca(NO_3)_2$, $CaCl_2$, $MgCl_2$, $AlCl_3$ and/or $Al(NO_3)_3$; organic acids such as succinic acid, citric acid, and morpholinoethane sulfonic acid; and polymeric cationic reagents such as PEI (polyethyleneimine).

Buffers may be used to modulate pH and they can be organic-based biological buffers, or inorganic buffers such as sodium phosphate. Furthermore, the buffer employed should provide a pH ranging from about 4 to about 9 in the practice of the invention, preferably from about 6 to about 8. Examples of preferably-employed organic buffers include Trizma Base, available from companies such as Aldrich Chemical (Milwaukee, Wis.), 4-morpholinoethane sulfonic acid (MES), and 4-morpholinepropanesulfonic acid (MOPS).

Any of the biocides commonly employed in ink-jet inks may be employed in the practice of the invention, such as NUOSEPT 95, available from Hals America (Piscataway, N.J.); PROXEL GXL, available from Zeneca (Wilmington, Del.); and glutaraldehyde, available from Union Carbide Company (Bound Brook, N.J.) under the trade designation UCARCIDE 250. PROXEL GXL is the preferred biocide.

Method of Synthesis

The dyes of the present invention may be synthesized using the general procedures and conditions described below:
Synthesis of Formula I:
Procedure 1: Dissolve one molar equivalent of the starting dye in deionized water with one molar equivalent of the carbohydrate (i.e., compound having $R_2$ or $R_4$ functionality).

Add 2 molar equivalent of hydrochloric acid to the reaction mixture and stir vigorously. Slowly add a molar equivalent of sodium cyanoborohydride (dissolved in methanol) to the reaction mixture. After addition of the sodium cyanoborohydride, slowly warm the reaction mixture to reflux and continue refluxing for a period of 4–8 hours. At the end of the reflux period, cool the reaction to room temperature, add enough hydrochloric acid to evolve hydrogen cyanide from the excess sodium cyanoborohydride. Concentrate the reaction mixture using reduced pressure and purify with the use of a silica gel column using acetonitrile and water as the eluent.

Procedure 2: A second synthesis to form compounds of type Formula I may be performed on dyes of Formula III. Dissolve the Formula III compound in tetrahydrofuran, add 2 molar equivalent of acid (e.g. 2-naphthalenesulfonic acid) to the reaction mixture. Slowly add a 2 molar equivalent of sodium cyanoborohydride (dissolved in methanol) to the reaction mixture. After addition of the sodium cyanoborohydride, slowly warm the reaction mixture to reflux and continue refluxing for a period of 4–8 hours. At the end of the reflux period, cool the reaction to room temperature. Concentrate the reaction mixture using reduced pressure and purify with the use of a silica gel column using acetonitrile and water as the eluent.
Synthesis of Formula II or Formula III:

Dissolve one molar equivalent of the dye in acetonitrile along with a four molar equivalent of the carbohydrate. Add a catalytic amount of hydrochloric acid to the reaction mixture and stir vigorously while refluxing for a period of 2–4 hours. After refluxing, cool the reaction to room temperature and remove the solvent under reduced pressure. Purify the dye using a silica gel column and acetonitrile as the eluent.

EXAMPLES

Example #1
Synthesis of Acid Blue TS-1

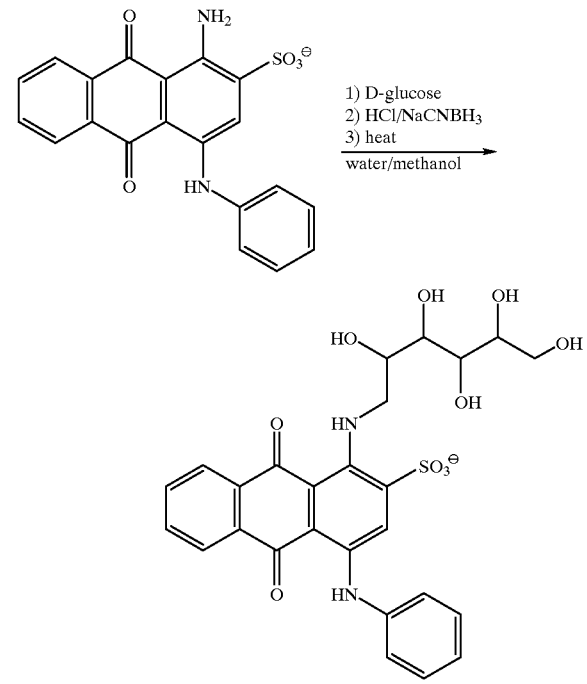

In a 500 mL, 3-neck, round bottom flask 4.27 g. of Acid Blue 25 and 4.69 g. of D-glucose was added and dissolved in 150 mL of deionized water. The flask was fitted with a reflux condenser and an addition funnel and the reaction mixture stirred vigorously. The reaction mixture then had 2.00 g. of concentrated hydrochloric acid (36%) added while in the addition funnel, 1.60 g. of sodium cyanoborohydride was dissolved in methanol. After allowing the D-glucose and Acid Blue 25 react for 30 minutes in the presence of hydrochloric acid, the sodium cyanoborohydride was slowly added to the reaction mixture. Upon complete addition of the sodium cyanoborohydride, the reaction was gently refluxed for 2 hours and then allowed to cool to room temperature. Additional hydrochloric acid was then added (to make the solution acidic and destroy any excess sodium cyanoborohydride) and the reaction mixture concentrated under reduced pressure. The dye (Acid Blue TS-1) was then purified on a silica gel column using acetonitrile and water as the eluents.

Example #2
Synthesis of Basic Red TS-2

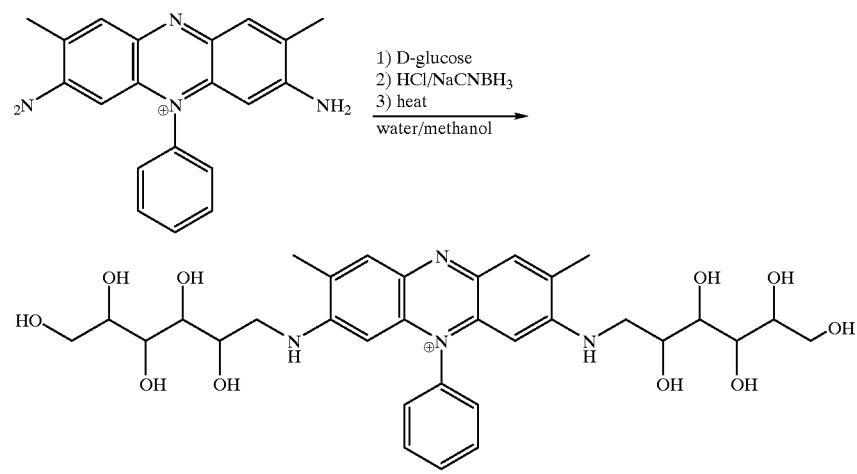

In a 500 mL, 3-neck, round bottom flask 4.49 g. of Basic Red 2 and 7.49 g. D-glucose was added and dissolved in 150 mL of deionized water. The flask was fitted with a reflux condenser and an addition funnel and the reaction mixture stirred vigorously. The reaction mixture then had 4.90 g. of concentrated hydrochloric acid (36%) added while in the addition funnel, 3.48 g. of sodium cyanoborohydride was dissolved in methanol. After allowing the D-glucose and Basic Red 2 react for 30 minutes in the presence of hydrochloric acid, the sodium cyanoborohydride was slowly added to the reaction mixture. Upon complete addition of the sodium cyanoborohydride, the reaction was gently refluxed for 2 hours and then allowed to cool to room temperature. Additional hydrochloric acid was then added (to ensure the solution is acidic to destroy any excess sodium cyanoborohydride) and the reaction mixture concentrated under reduced pressure. The dye (Basic Red TS-2) was then purified on a silica gel column using acetonitrile and water as the eluents.

Example #3
Synthesis of Direct Blue TS-1

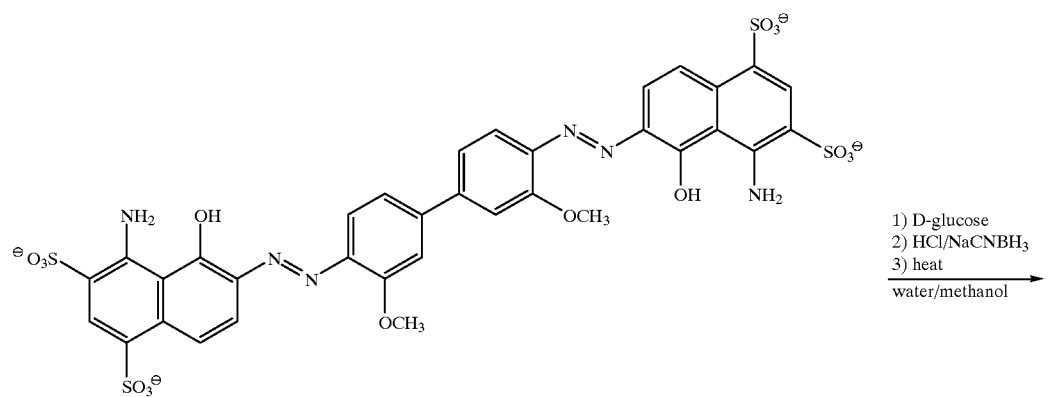

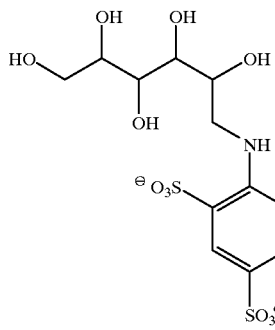
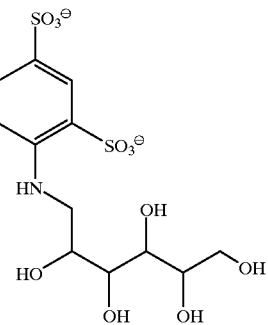

In a 500 mL, 3-neck, round bottom flask 6.73 g. of Direct Blue 1 and 6.32 g. of D-glucose was added and dissolved in 150 mL of deionized water. The flask was fitted with a reflux condenser and an addition funnel and the reaction mixture stirred vigorously. The reaction mixture then had 2.87 g. of concentrated hydrochloric acid (36%) added while in the addition funnel, 1.80 g. of sodium cyanoborohydride was dissolved in methanol. After allowing the D-glucose and Direct Blue 1 to react for 30 minutes in the presence of hydrochloric acid, the sodium cyanoborohydride was slowly added to the reaction mixture. Upon complete addition of the sodium cyanoborohydride, the reaction was gently refluxed for 2 hours and then allowed to cool to room temperature. Additional hydrochloric acid was then added (to ensure the solution is acidic to destroy any excess sodium cyanoborohydride) and the reaction mixture concentrated under reduced pressure. The dye (Direct Blue TS-1) was then purified on a silica gel column using acetonitrile and water as the eluents.

Inks were prepared, comprising components described above (e.g., water, at least one water-soluble organic solvent, and optional ingredients such as surfactants and biocides). Each ink also contained from about 1 to about 5 wt. % of a dye (dye concentration adjusted to provide desired print quality) as described in Table I:

TABLE I

| Ink Id | Dye | Comment |
| --- | --- | --- |
| 1 | Acid Blue TS-1 | Dye of the present invention |
| 2 | Basic Red TS-2 | Dye of the present invention |
| 3 | Acid Blue 25 | Parent dye to Acid Blue TS-1 |
| 4 | Basic Red 2 | Parent dye to Basic Red TS-2 |

The formulated inks were supplied to ink-jet printheads and used to generate print samples for further evaluation, namely, smear fastness and water fastness, and reported in Table II. To evaluate smear and water fastness print samples were generated containing solid area fills.

Smear fastness was evaluated by drawing a line through the area fills using a highlighter pen. The optical density of the transferred colorant from the ink filled area to an unimaged part of the media was measured using a densitometer. This measurement was made for the dyes samples according to the present invention and their starting, unmodified dye. For each modified and unmodified dye a percent transfer number was calculated.

Waterfastness was evaluated by dripping a predetermined quantity of water on the area fills. The optical density of the transferred colorant from the ink filled area to an unimaged part of the media was measured using a densitometer. For each modified and unmodified dye a percent transfer number was calculated.

The improvements in smear fastness and water fastness as a result of the present invention are reported in Table II as calculated by Equation I and is reported in Table II as % improvement over unmodified dye:

% transfer (modified dye)–% transfer (unmodified dye)  Equation I

TABLE II

| | % Improvement over Parent Dye[1] | |
| --- | --- | --- |
| Dye ID | Waterfastness | Smearfastness |
| Acid Blue TS-1 | 2.56 | 2.83 |
| Basic Red TS-2 | 11.28 | 2.14 |

As can be seen from the data in Table II, one or more of the smear fastness and water fastness performance was improved as a result of the present invention.

Thus, there has been disclosed dyes, coloring liquids, and inks formulated using the same, having either or both improved water fastness and smear fastness. It will be readily apparent to those skilled in the art that various changes and modifications of an obvious nature may be made without departing from the spirit of the invention. All such changes and modifications are considered to fall within the scope of the invention as defined by the appended claims.

What is claimed is:

1. An inkjet ink composition comprising:

at least one compound having formula I, II, III, or a combination thereof

Formula I

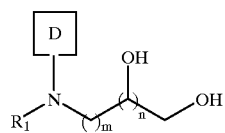

-continued

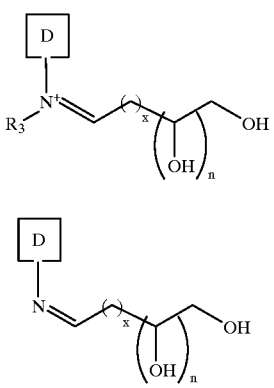

Formula II

Formula III wherein

D is chromophore;

$R_1$ is H or $C_1$–$C_5$;

$R_3$ is $C_1$–$C_5$.

2. The ink of claim 1 wherein:

$R_1$ is H or $CH_3$;

$R_3$ is $CH_3$.

3. The ink of claim 1 wherein:

m is 1–2;

n is 3–5;

x is 0–1.

4. The ink of claim 1 wherein:

m is 1;

n is 4;

x is 0.

5. A coloring liquid composition comprising: at least one compound having formula I, II, III, or a combination thereof

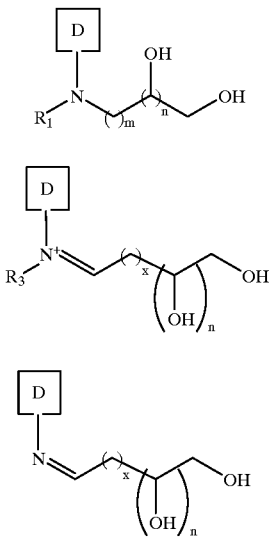

Formula I

Formula II

Formula III wherein

D is chromophore;

$R_1$ is H or $C_1$–$C_5$;

$R_3$ is $C_1$–$C_5$.

6. The liquid of claim 5 wherein:

$R_1$ is H or $CH_3$;

$R_3$ is $CH_3$.

7. The liquid of claim 5 wherein:

m is 1–2;

n is 3–5;

x is 0–1.

8. The liquid of claim 5 wherein:

m is 1;

n is 4;

x is 0.

9. A dye composition comprising:

at least one compound having formula I, II, III, or a combination thereof

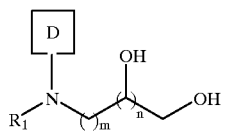

Formula I

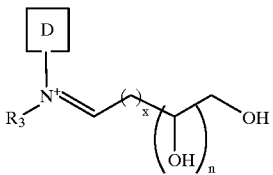

Formula II

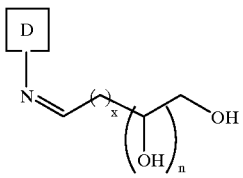

Formula III wherein

D is chromophore;

$R_1$ is H or $C_1$–$C_5$;

$R_3$ is $C_1$–$C_5$.

10. The dye of claim 9 wherein:

$R_1$ is H or $CH_3$;

$R_3$ is $CH_3$.

11. The dye of claim 9 wherein:

m is 1–2;

n is 3–5;

x is 0–1.

12. The liquid of claim 9 wherein:

m is 1;

n is 4;

x is 0.

* * * * *